(12) United States Patent
Nakamura et al.

(10) Patent No.: US 7,913,801 B2
(45) Date of Patent: Mar. 29, 2011

(54) STEERING DEVICE FOR CONSTRUCTION VEHICLE

(75) Inventors: Tsuyoshi Nakamura, Tsuchiura (JP);
Kentaro Itoga, Tsuchiura (JP);
Hiroyuki Azuma, Tsuchiura (JP);
Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 62 days.

(21) Appl. No.: 12/523,937

(22) PCT Filed: Jan. 22, 2008

(86) PCT No.: PCT/JP2008/050807
§ 371 (c)(1),
(2), (4) Date: Jul. 21, 2009

(87) PCT Pub. No.: WO2008/090883
PCT Pub. Date: Jul. 31, 2008

(65) Prior Publication Data
US 2010/0101888 A1 Apr. 29, 2010

(30) Foreign Application Priority Data
Jan. 25, 2007 (JP) ................................ 2007-015053

(51) Int. Cl.
*B62D 5/04* (2006.01)
(52) U.S. Cl. .......................... 180/442; 180/441; 180/403
(58) Field of Classification Search .................. 180/403, 180/414, 417, 421, 441, 442, 443
See application file for complete search history.

(56) References Cited

U.S. PATENT DOCUMENTS

| | | | | |
|---|---|---|---|---|
| 5,947,228 A * | 9/1999 | Rolando | ........................ | 180/417 |
| 6,408,977 B1 * | 6/2002 | Obertrifter et al. | ........... | 180/442 |
| 2008/0277190 A1 * | 11/2008 | McCord et al. | ................ | 180/444 |
| 2010/0051376 A1 * | 3/2010 | Tanaka et al. | .................. | 180/442 |
| 2010/0108431 A1 * | 5/2010 | Makuta et al. | ................. | 180/422 |

FOREIGN PATENT DOCUMENTS

| | | |
|---|---|---|
| JP | 63-49087 | 4/1988 |
| JP | 8-67263 A | 3/1996 |
| JP | 2002-512922 A | 5/2002 |
| JP | 2005-297924 A | 10/2005 |
| JP | 2005-538883 A | 12/2005 |
| WO | WO 2004/024537 A1 | 3/2004 |

* cited by examiner

*Primary Examiner* — Joanne Silbermann
*Assistant Examiner* — Tashiana Adams
(74) *Attorney, Agent, or Firm* — Crowell & Moring LLP

(57) ABSTRACT

To provide a steering system for a construction vehicle, which is suited not only for traveling on general roadways but also for work at construction sites and can perform high-reliability steering control.

A steering system for a construction vehicle is provided with a directional control valve 5 for controlling a flow of pressure oil to body-articulating hydraulic cylinders 2 that perform steering and also with a steering-wheel-operated signal generation means 6 for outputting by operation of a steering wheel 7*a* a pilot signal to the directional control valve 5 for switching the valve 5. The steering system is also provided with a lever-operated signal generation means for producing by operation of a lever 10*a* a pilot signal to switch the directional control valve 5, said lever-operated signal generation means including pressure-proportional solenoid valves 12*a*, 12*b* or the like, selector valves 13*a*,13*b* switchable to permit selectively outputting the pilot signal from one of the signal generation means to the directional control valve 5, and an automated switching means for switching the selector valves 13*a*,13*b* such that upon operation of the steering wheel 7*a*, the pilot signal from the steering-wheel-operated signal generation means 6 can be preferentially outputted to the directional control valve 5.

3 Claims, 2 Drawing Sheets

STEERING DEVICE FOR CONSTRUCTION VEHICLE

TECHNICAL FIELD

This invention relates to a steering system for a construction vehicle. The steering system is provided with steering hydraulic cylinders for performing steering of the vehicle and a pilot-operated directional control valve for controlling the steering hydraulic cylinders. The steering system is also provided with a steering-wheel-operated signal generation means that generates a pilot signal by rotational operation of a steering wheel to perform switching operation of the pilot-operated directional control valve.

BACKGROUND ART

Steering systems for construction vehicles include those provided with steering hydraulic cylinders as actuators for performing steering of a vehicle, a pilot-operated directional control valve for controlling a direction and amount of pressure oil to be fed to the steering hydraulic cylinders, and a steering-wheel-operated signal generation means provided with a rotationally-operable steering wheel and having a rotary directional control valve or the like for generating a pilot signal such that by rotational operation of the steering wheel, a pilot signal is generated to switch an operated position and opening area of the pilot-operated directional control valve. Examples of construction vehicles equipped with such a steering system include articulated construction vehicles that upon turning, their self-propelled bodies are articulated to make them go in a curve, and as their representative examples, articulated wheel loaders can be mentioned.

In such an articulated construction vehicle, a self-propelled body is divided into a front frame supported by front wheels and a rear frame supported by rear wheels, and both the frames are connected rotatably relative to one another in a horizontal direction such that the self-propelled body can be articulated. Also provided as hydraulic actuators for articulating the self-propelled body are body-articulating hydraulic cylinders selectively extendable or retractable such that the front frame can be driven to rotate relative to the rear frame in the horizontal direction. The steering systems for construction vehicles include those equipped with steering hydraulic cylinders, typified by such body-articulating hydraulic cylinders, as vehicle-steering actuators. Steering systems for construction vehicles, said steering systems being equipped with such actuators, can be divided roughly into those of the wheel type that they are provided with a steering wheel to be rotationally operated and those of the lever type that they are provided with a lever to be tilt (pivot)-operated.

It obviously becomes necessary to make the articulated construction vehicle travel when performing work, for example, when performing digging work or loading work of excavated earth and/or sand on a truck by a wheel loader at a construction site. Because such a wheel loader can travel at 35 km or so per hour, it would be convenient if the wheel loader can be designed to permit traveling to go and come on general roadways in addition to traveling to perform such work. In fact, an articulated construction vehicle is allowed under regulations to travel on general roadways. When traveling on general roadways, however, it is required under regulations to operate a steering system through a steering wheel. For this reason, wheel-type steering systems have heretofore been generally adopted for construction vehicles such as articulated construction vehicles.

A wheel-type, construction-vehicle steering system provided with hydraulic cylinders as hydraulic actuators for steering as mentioned above is disclosed, for example, in Patent Document 1. Considering the features of such a wheel-type, construction-vehicle steering system, operation of a steering wheel is rotational operation as opposed to tilt operation of a lever, and the steering wheel is extremely large in the amount of maximum operation compared with the lever. This construction-vehicle steering system can, therefore, perform fine control. Concerning the operation of a steering system, traveling on a general roadway requires to frequently perform fine control such as making the vehicle turn subtly although it is unnecessary to frequently perform such control as making the vehicle go in a large curve. A construction vehicle provided with a wheel-type steering system is hence suited for traveling on general roadways. The construction vehicle provided with such a wheel-type steering system can be driven or operated with the same maneuvering feeling as general cars, and in this respect, is also suited for traveling on general roadways.

Patent Document 1: Japanese Utility Model Application No. SHO 63-49087 (JP-B-63-49087 U) (pages 1-3, FIG. 4)

DISCLOSURE OF THE INVENTION

Problem to be Solved by the Invention

A construction vehicle with a wheel-type steering system adopted therein is suited for traveling on general roadways as described above, but is not fully suited for work at construction sites. An explanation will be made about its reasons. Firstly, it is necessary to frequently perform large control to make the vehicle body go in a curve when performing work at a construction site. As mentioned above, operation of a steering wheel is extremely large in the amount of maximum operation compared with operation of a lever. When digging work is performed by an articulated wheel loader at a narrow working site, for example, it often becomes necessary to make the vehicle body go in a curve leftwards and rightwards to maximum extent. In such a case, the steering wheel has to be rotated counterclockwise four full turns or clockwise two full turns. By the construction vehicle with the steering system of this type adopted therein, large control which requires a large operation amount as described above is frequently performed so that a control-related considerable load is applied to an operator to cause operator fatigue.

Secondly, a steering wheel is suited for its operation while being held with both hands. However, when traveling while performing work as in the case of performing digging work by an articulated wheel loader, one or more hydraulic actuators relating to the work need to be also operated in addition to the steering hydraulic cylinders. This unavoidably requires to operate the steering wheel with only one hand, so that the operation is awkward. Further, such working hydraulic actuators are generally operated by control means such as levers, and therefore, are manually operated by the operation means which perform movements of different kind from that of the steering wheel. When traveling while performing work, it is therefore necessary to perform operation of different kind from that of the steering wheel, such as tilt-operation of a control means like a lever with one hand while rotationally operating the steering wheel with the other hand. This also makes the operation awkward. For these reasons, the construction vehicle with the wheel-type steering system adopted therein is not fully considered to be suited for work at construction sites.

For the resolution of the above-mentioned problem inherent to construction vehicles, it is required to improve their steering systems to become suited for work at construction sites by improving their constructions such that during work at construction sites, a lever-type steering system can be used at each operator's selection. On the other hand, wheel-type steering systems which have been commonly employed to date in construction vehicles have excellent driving and operation characteristics that they allow to perform fine control as mentioned above and also to perform driving operation with the same feeling as general cars and moreover, that they are high in the reliability of steering control compared with lever-type steering systems because as steering systems for construction work, they have taken root among operators. It is, therefore, desired to improve a wheel-type steering system such that, even when work is being performed with a lever-type steering system, steering control of still higher reliability can be conducted by instantaneously permitting the use of the wheel-type steering system in the event of an emergency such that a danger must be avoided urgently.

The present invention has been developed to meet such demand and desire, and its technical object is to provide a construction-vehicle steering system, which is not only suited for traveling on general roadways but also suited for work at construction sites and moreover, which makes it possible to perform steering control with high reliability.

Means for Achieving the Object

To achieve the above-described technical object, the present invention provides a steering system for a construction vehicle, said steering system being provided with steering hydraulic cylinders as actuators for performing steering of the vehicle, a pilot-operated directional control valve for controlling a direction and amount of pressure oil to be fed to the steering hydraulic cylinders, and a steering-wheel-operated signal generation means provided with a rotationally-operable steering wheel such that by rotational operation of the steering wheel, a pilot signal is generated to switch an operated position and opening area of the pilot-operated directional control valve, wherein:

the steering system comprises a lever-operated signal generation means provided with a tilt-operable steering lever to generate by tilt operation of the lever a pilot signal for switching the operated position and opening area of the pilot-operated directional control valve, selector valves switchable such that the pilot signal from the steering-wheel-operated signal generation means or the pilot signal from the lever-operated signal generation means can be selectively outputted to the pilot-operated directional control valve, a lever-operated manual switching means for switching the selector valves such that by manual operation, the pilot signal from the lever-operated signal generation means can be outputted to the pilot-operated directional control valve to permit steering the vehicle by tilt operation of the steering lever, and an automated switching means for preferential control by the steering wheel to automatically switch the selector valves such that upon rotational operation of the steering wheel, the pilot signal from the steering-wheel-operated signal generation means can be outputted to the pilot-operated directional control valve even when the selector valves have been switched by the manual operation of the manual switching means to permit outputting the pilot signal from the lever-operated signal generation means to the pilot-operated directional control valve.

A description will next be made about advantages of the construction-vehicle steering system according to the present invention. As this construction-vehicle steering system is provided with the steering-wheel-operated signal generation means which is in turn provided with the rotationally-operable steering wheel, the construction vehicle is conveniently allowed under regulations to travel going and coming on general roadways. Further, the operation of the steering wheel is rotational operation and the amount of maximum operation is extremely large. Accordingly, the steering wheel makes it possible to easily perform fine control which needs to be frequently performed during traveling on a general roadway, and also makes it possible to perform driving operation with similar maneuvering feeling as general cars. The construction-vehicle steering system is, therefore, suited for traveling on general roadways while retaining the excellent performance of the conventional construction-vehicle steering systems as they are.

In addition to the equipment of such excellent performance of the conventional technologies as they are, the construction-vehicle steering system according to the present invention is also provided with the lever-operated, electrical control device that is provided with the tilt-operable lever and outputs an electrical signal by the tilt operation, and is designed to permit selective performance of operation by the lever-operated, electrical control device through "the selection means of the operation system". Different from the conventional technologies, the articulated construction vehicle according to the present invention is also suited for work at construction sites. Described specifically, the operation of the lever in the lever-operated, electrical control device is tilt operation that causes the lever to tilt by bending or extending the wrist while holding the lever with one hand. The amount of maximum operation is extremely small compared with that of operation of the steering wheel. Even if it becomes necessary during work at a construction site to frequently perform large control the amount of which is large, the operational load applied to an operator is far smaller compared with that applied by operation of the steering wheel.

The steering lever is suited for operation by holding it with one hand. When traveling is performed at a construction site while performing work there as in the case of performing digging work by a wheel loader, a control means for one or more hydraulic actuators relating to the work can, therefore, be easily operated with one hand while operating the steering lever with the other hand. At this time, the operation of the steering hydraulic cylinders is performed under control by the lever as in the operation commonly performed in the operation of the one or more hydraulic actuators for the work. Therefore, the operation of both the hydraulic actuators can be performed by operation means of the same kind unlike the conventional technology, and hence, can be performed with ease compared with the conventional technology.

As is readily appreciated from the above description, the construction-vehicle steering system according to the present invention can perform steering control, which is not only suited for traveling on general roadways but also suited for work at construction sites. In addition to such an excellent operational function, even when the manual switching means has been switched to a mode that uses the steering lever, high-reliability steering control can still be performed by instantaneously permitting control by the steering wheel in the event of an emergency. Described specifically, the construction-vehicle steering system is provided especially with the automated switching means for preferential control by the steering wheel. Even when the selector valves have been switched by the manual switching means to permit the use of the steering lever, the selector valves are, therefore, automatically switched to permit outputting a pilot signal from the steering-wheel-operated signal generation means to the pilot-operated directional control valve when the steering wheel, which is excellent in operability and is high in reliability, is rotationally operated in an instant in the event of an emergency.

With the construction-vehicle steering system according to the present invention, steering control can hence be performed by the steering wheel in the event of an emergency even when work is being performed with the manual switching means switched to the mode that uses the steering lever, because upon rotational operation of the steering wheel by the operator as needed, control by the steering wheel can be instantaneously performed without needing switching operation by the manual switching means. As described above, the construction-vehicle steering system is suited not only for traveling on general roadways but also for work at construction sites and can perform high-reliability steering control.

ADVANTAGEOUS EFFECTS OF THE INVENTION

As will become evident from the following description, the construction-vehicle steering system according to the present invention is suited not only for traveling on general roadways but also for performing work at construction sites and can perform high-reliability steering control because it is constructed as described in the above-described item "Means for Solving the Problem". As a consequence, the construction-vehicle steering system can reduce an operational load on its operator to decrease the operator's fatigue compared with the conventional technology upon performing steering control of the construction vehicle, and can also improve the safety with respect to steering control of the construction vehicle. Further, it is also designed to perform, through the same pilot-operated directional control valve, the control of the steering hydraulic cylinders by a pilot signal from any one of the steering-wheel-operated signal generation means and the lever-operated signal generation means. This has made it possible to decrease the number of pilot-operated directional control valves to be arranged for controlling the steering hydraulic cylinders and hence to simplify the hydraulic circuit.

If the construction-vehicle steering system according to the present invention is practiced especially as described in claim 2 upon practicing it, the automated switching means for preferential control by the steering wheel can be constructed by simply using hydraulic pilot-operated switching valves as selector valves and designing to guide a pilot signal from the steering-wheel-operated signal generation means to the other signal-receiving port of each selector valve to switch the pilot-operated directional control valve. It is, therefore, possible to simplify the construction required for the addition of the automated switching means for preferential control by the steering wheel.

If the construction-vehicle steering system according to the present invention is practiced especially as described in claim 3 upon practicing it, pilot oil from the pilot pump, the pilot pressure of which is especially stable, is designed to be guided to the other signal-receiving port of each selector valve through the cancel valve when changing the selector valves by the automated switching means for preferential control by the steering wheel. This facilitates to design such that the selector valves can be surely switched upon operation of the steering wheel. As a consequence, it is possible to heighten the reliability for the switching operation of the selector valves by the automated switching means for preferential control by the steering wheel.

BEST MODES FOR CARRYING OUT THE INVENTION

Desired embodiments for carrying out the present invention will hereinafter be manifested by describing with reference to FIG. 1 and FIG. 2 how the present invention can be actually practiced.

FIG. 1 is a hydraulic circuit diagram of a construction-vehicle steering system according to a first embodiment as constructed by practicing the present invention. FIG. 2 is a hydraulic circuit diagram of a construction-vehicle steering system according to a second embodiment as constructed by practicing the present invention. A description will hereinafter be made of the construction-vehicle steering systems according to the present invention, in which the description will be made by taking, by way of example, cases in which the steering systems are practiced as steering systems for articulated wheel loaders.

Referring to FIG. 1, a description will firstly be made of general technical details about the articulated wheel loader for practicing the present invention by providing a steering system.

Depicted in FIG. 1 are a self-propelled body 1 in the articulated wheel loader as a construction vehicle which is provided with a work implement, an operator's cab and the like and travels by wheels; a front frame 1a as a front body which is supported by front wheels and constitutes a front section of the self-propelled body 1; a rear frame 1b as a rear body which is supported by rear wheels and constitutes a rear section of the self-propelled body 1; a pin 1c connecting the front frame 1a to the rear frame 1b rotatably relative to each other in a horizontal direction; and body-articulating hydraulic cylinders 2 extendable or retractable as steering hydraulic actuators to drive such that the front frame 1a can be driven to rotate relative to the rear frame 1b in the horizontal direction about the pin 1c to articulate the self-propelled body 1 and to perform steering of the vehicle.

The articulated wheel loader is provided on the front frame 1a thereof with an unillustrated work implement which can perform various work such as earth and/or sand digging work, loading work and snow ploughing work. Further, an unillustrated operator's seat is mounted on the rear frame 1b such that an operator can maneuver the work implement and the self-propelled body 1. This articulated wheel loader is constructed such that the operator can perform work at a construction site or can travel going or coming on a roadway by extending or retracting the body-articulating hydraulic cylinders 2 to rotate the front frame 1a relative to the rear frame 1b.

The work implement is equipped with a lift arm supported on a front part of the front frame 1a and mounted pivotally up and down about the support point; a bucket mounted pivotally in an up-and-down direction on a front end part of the lift arm; a lift arm cylinder extendable or retractable as a hydraulic actuator to drive the lift arm such that the lift arm is raised or lowered; and a bucket cylinder extendable or retractable as a hydraulic cylinder to drive the bucket such that the bucket can be pivoted in the up-and-down direction. With this wheel loader, various work may be performed by controlling the steering, body-articulating hydraulic cylinders 2 by an operation means in association with the hydraulic actuators for the work implement as needed. In digging work of earth and/or sand or snow ploughing work, for example, operation of the hydraulic actuators for the work implement and operation of the body-articulating hydraulic cylinders 2 may be performed in association with each other when the bucket and lift arm are driven to perform digging or snow ploughing while driving the bucket into earth and/or sand or snow under advancing force at the time of traveling or when performing loading work in the course of the digging or snow ploughing work.

Based on FIG. 1, a description will next be made about the steering system according to the first embodiment of the present invention for a construction vehicle.

FIG. 1 shows a hydraulic pump 3 drivable by an engine (not shown) to produce a hydraulic pressure to drive the body-articulating hydraulic cylinders 2; a pilot pump 4 arranged, in a system different from a flow line for pressure oil from the hydraulic pump 3, as a hydraulic pilot pressure production source for producing a hydraulic pilot pressure; a pilot-operated directional control valve 5 arranged on the delivery side of the hydraulic pump 3 for changing the direction and flow rate of pressure oil, which is to be fed from the hydraulic pump 3 to the body-articulating hydraulic cylinders 2, to control the operation of the cylinders 2; a first pressure-oil feed and drain line a for connecting the left-side output port of the pilot-operated directional control valve 5 to the bottom side of the left-side body-articulating hydraulic cylinder 2 and the rod side of the right-side body-articulating hydraulic cylinder 2; a second pressure-oil feed and drain line b for connecting the right-side output port of the pilot-operated directional control valve 5 to the rod side of the left-side body-articulating hydraulic cylinder 2 and the bottom side of the right-side body-articulating hydraulic cylinder 2.

Depending on the direction of rotational operation of a steering wheel 7a to be mentioned subsequently herein, a hydraulic pilot pressure is fed from the pilot pump 4 to the corresponding one of the left and right, signal-receiving ports of the pilot-operated directional control valve 5 to switch it from the neutral position to the corresponding one of the left and right positions. When switched to the left position, the pilot-operated directional control valve 5 feeds the pressure oil from the hydraulic pump 3 to the bottom side of the left-side, body-articulating hydraulic cylinder 2 through the first pressure-oil feed and drain line a, and further, drains the pressure oil from the rod side of the left-side, body-articulating hydraulic cylinder 2 to an oil reservoir 9 through the second pressure-oil feed and drain line b. As a consequence, the left-side body-articulating hydraulic cylinder 2 is extended. In parallel with these operation, the pilot-operated directional control valve 5 feeds the pressure oil from the hydraulic pump 3 to the rod side of the right-side, body-articulating hydraulic cylinder 2 through the first pressure-oil feed and drain line a, and further, drains the pressure oil from the bottom side of the right-side, body-articulating hydraulic cylinder 2 to the oil reservoir 9 through the second pressure-oil feed and drain line b. As a consequence, the right-side body-articulating hydraulic cylinder 2 is retracted. As a result, the front frame 1a is rotated in a rightward direction relative to the rear frame 1b.

When the pilot-operated directional control valve 5 is switched to the right position, on the other hand, the pilot-operated directional control valve 5 feeds the pressure oil from the hydraulic pump 3 to the rod side of the left-side, body-articulating hydraulic cylinder 2 through the second pressure-oil feed and drain line b, and further, drains the pressure oil from the bottom side of the left-side, body-articulating hydraulic cylinder 2 to the oil reservoir 9 through the first pressure-oil feed and drain line a. As a consequence, the left-side body-articulating hydraulic cylinder 2 is retracted. At the same time, the pilot-operated directional control valve 5 feeds the pressure oil from the hydraulic pump 3 to the bottom side of the right-side, body-articulating hydraulic cylinder 2 through the second pressure-oil feed and drain line b, and further, drains the pressure oil from the rod side of the right-side, body-articulating hydraulic cylinder 2 to the oil reservoir 9 through the first pressure-oil feed and drain line a. As a consequence, the right-side body-articulating hydraulic cylinder 2 is extended. As a result, the front frame 1a is rotated in a leftward direction relative to the rear frame 1b. In the above-described switching operation of the pilot-operated directional control valve 5 by the rotational operation of the steering wheel 7a, the extending or retracting speed of each body-articulating hydraulic cylinder 2 can be controlled by adjusting the opening area in accordance with the amount of operation of the steering wheel 7a.

Also illustrated are a steering-wheel-operated signal generation means 6 that is provided with the steering wheel 7a and that by rotational operation of the steering wheel 7a, produces a pilot signal to switch the operated position (the left position or right position switched from the neutral position) and the opening area (the cross-sectional area of a flow passage for the pilot oil) of the pilot-operated directional control valve 5; a rotary directional control valve 7 arranged on the delivery side of the pilot pump 4 such that by rotational operation of the steering wheel 7a attached to a spool 7b, a hydraulic pilot pressure is outputted to the corresponding one of the left and right, signal-receiving ports of the pilot-operated directional control valve 5 to switch the pilot-operated directional control valve 5 from the neutral position to the right position or left position; a gear pump 8 rotatable in two directions, normal and reverse, in synchronization with rotation of the spool 7b of the rotary directional control valve 7; the oil reservoir 9 for retaining working oil and pilot oil therein; a left pilot line c for guiding pilot oil to the left signal-receiving port of the pilot-operated directional control valve 5; and a right pilot line d for guiding pilot oil to the right signal-receiving port of the pilot-operated directional control valve 5.

In the embodiment depicted in FIG. 1, the steering-wheel-operated signal generation means 6 is constructed by providing the rotary directional control valve 7 and gear pump 8. The rotary directional control valve 7 is constructed by providing a valve main body 7c having a snug-fit bore formed therein, the rotary spool 7b rotatably fitted in the snug-fit bore of the valve main body 7c for rotation by rotational operation of the steering wheel 7a, and springs 7d for holding the rotary spool 7b at the neutral position. By rotating the rotary spool 7b, plural ports arranged in the valve main body 7c are opened or closed by the rotary spool 7b to switch the flow direction and flow rate of the pilot oil. For the sake of convenience in description, FIG. 1 shows this rotary-spool-type directional control valve 7 as if it is a slide-spool-type directional control valve with the rotary spool 7b linearly slidable from the neutral position to the left or right position within the valve main body 7c. A description on this rotary directional control valve 7 will hereinafter be made based on the directional control valve 7 shown in FIG. 1.

When the steering wheel 7a is rotationally operated either counterclockwise or clockwise, the flow passage of the rotary directional control valve 7 is switched from the neutral position depending on the direction of the rotational operation. When rotationally operated counterclockwise, the rotary directional control valve 7 is brought into a state equivalent to the state of the directional control valve 7 of FIG. 1 as switched to the left position, so that the flow passage which is in communication with the pilot pump 4 is connected to the suction side of the gear pump gear pump 8 at the time of counterclockwise rotation, the delivery side of the gear pump 8 at the time of counterclockwise rotation is connected to the right pilot line d, and the left pilot line c is connected to the flow line which communicates to the oil reservoir 9.

When rotationally operated clockwise, the rotary directional control valve 7 is brought into a state equivalent to the state of the directional control valve 7 of FIG. 1 as switched to the right position, so that the flow passage which is in communication with the pilot pump 4 is connected to the suction side of the gear pump 8 at the time of clockwise rotation, the delivery side of the gear pump 8 at the time of clockwise rotation is connected to the left pilot line c, and the right pilot line d is connected to the flow line which is in communication with the oil reservoir 9. In the above-described switching operation of the pilot-operated directional control valve 5 by the rotational operation of the steering wheel 7a, the hydraulic pilot pressure can be controlled by adjusting the opening area of the flow passage of the directional control valve 7 in accordance with the amount of operation of the steering wheel 7a.

The gear pump 8 is connected such that its rotary shaft becomes coaxial with the rotary spool 7b and, when the rotary spool 7b is rotated by rotational operation of the steering wheel 7a, the rotary shaft of the gear pump 8 is also correspondingly rotated in synchronization with the rotation of the rotary spool 7b. When the rotary directional control valve 7 is switched from the neutral position by either clockwise or counterclockwise rotational operation of the steering wheel 7a, the gear pump 8 is, therefore, also manually and rotationally driven in association with the rotational operation of the steering wheel 7a. As a result, the gear pump 8 acts as a so-called hand pump ad the pilot oil from the pilot pump 4 is guided to the corresponding one of the left and right pilot lines c,d through the flow passage of the rotary directional control valve 7.

Upon completion of the rotational operation of the steering wheel 7a, the rotary spool 7b is rotated under bias by the spring 7d in a direction opposite to the direction of the rotational operation of the steering wheel 7a so that the rotary spool 7b is caused to return to the neutral position. At this time, the gear pump 8 which is coaxial with the rotary spool 8 also rotates in the opposite direction. In the course of these operation, the steering-wheel-operated signal generation means 6 composed of the rotary directional control valve 7 and the gear pump 8 guides the pilot oil in a predetermined volume, which corresponds to the amount of rotation of the rotary spool 7b, as a pilot signal to the corresponding one of the signal-receiving ports of the pilot-operated directional control valve 5 through the gear pump 8. As a consequence, the opening area of the pilot-operated directional control valve 5 can be adjusted.

As the steering-wheel-operated signal generation means 6 of FIG. 1 is equipped with such a mechanism as described above, the rotary spool 7b returns to the neutral position by itself under bias of the spring 7d when the pilot oil in a predetermined amount corresponding to the amount of rotational operation of the steering wheel 7a is guided to the corresponding one of the signal-receiving ports of the pilot-operated directional control valve 5 at the time of actuation of the steering-wheel-operated signal generation means 6. The steering-wheel-operated signal generation means 6, therefore, does not require such a trouble that the operator is supposed to perform rotational operation of the steering wheel 7 in the opposite direction to have the rotary spool 7b returned to the neutral position whenever the steering wheel 7a is rotationally operated. According to this steering-wheel-operated signal generation means 6, the load of operation of the steering wheel at the steering-wheel-operated control device which is high in operational load can hence be reduced, thereby contributing to a reduction in the operator's fatigue caused by the steering control.

The description has been made above, centering around the steering hydraulic circuit associated with the steering-wheel-operated signal generation means 6. A description will hereinafter be made about a steering hydraulic circuit associated with the lever-operated, electrical control device.

Depicted are a lever-operated, electrical control device 10 provided with a tilt-operable steering lever 10a to output an electrical signal by tilt operation of the lever 10a; a controller 11 for being inputted with the electrical signal from the lever-operated, electrical control device 10 to output an electrical signal concerning the direction and amount of the operation of the steering lever 10a; a first pressure-proportional solenoid valve 12a capable of adjusting the output value of a hydraulic pilot pressure to be guided from a main pilot line e to a secondary-side pilot line f by adjusting its opening area in accordance with the output value of the electrical signal from the controller 11; a second pressure-proportional solenoid valve 12b capable of similarly adjusting the output value of a hydraulic pilot pressure to be guided from the main pilot line e to a secondary-side pilot line g; the main pilot line e for supplying pilot oil as pilot signals from the pilot pump 4 to the various valves; the pilot line f for guiding pilot oil from the secondary side of the first pressure-proportional solenoid valve 12a to the left signal-receiving port of the pilot-operated directional control valve 5; and the secondary-side pilot line g for guiding pilot oil from the secondary side of the second pressure-proportional solenoid valve 12b to the right signal-receiving port of the pilot-operated directional control valve 5.

The lever-operated, electrical control device 10 is constructed such that, when the steering lever 10a is tilt-operated, an electrical signal concerning a voltage value to be outputted to the controller 11 changes in accordance with the direction and amount of the tilt operation. Based on an electrical signal outputted from the lever-operated, electrical control device 10, the controller 11 generates an electrical signal corresponding to the direction and amount of the operation of the lever 10a, and outputs this electrical signal to the corresponding one of signal-receiving ports of the first pressure-proportional solenoid valve 12a or the second pressure-proportional solenoid valve 12b in accordance with the direction of the operation of the lever 10a. Then, the pressure-proportional solenoid valve 12a or 12b which has received the electrical signal outputs a hydraulic pilot pressure to switch the pilot-operated directional control valve 5 under conditions that selector valves 13a,13b to be described subsequently herein have been switched to lower positions.

Described specifically, the first pressure-proportional solenoid valve 12a actuates responsive to an electrical signal concerning the direction of operation of the steering lever 10a from the controller 11, and is switched from the right position to the left position. When switched to the left position, a hydraulic pilot pressure from the main pilot line e is outputted from the pilot line f to the left signal-receiving port of the pilot-operated directional control valve 5 through the first selector valve 13a to switch the directional control valve 5 to the left position. During this operation, the pilot oil in the right signal-receiving port of the pilot-operated directional control valve 5 is drained from the second selector valve 13b to the oil reservoir 9 through the second pressure-proportional solenoid valve 12b, which has been switched to the right position and remains in the original state, after flowing through the pilot line g.

Similarly, the second pressure-proportional solenoid valve 12b is switched from the right position to the left position responsive to an electrical signal concerning the direction of operation of the steering lever 10a. When switched to the left position, a hydraulic pilot pressure from the main pilot line e is outputted from the pilot line g to the right signal-receiving port of the pilot-operated directional control valve 5 through the second selector valve 13b to switch the directional control valve 5 to the right position. During this operation, the pilot oil in the left signal-receiving port of the pilot-operated directional control valve 5 is drained from the first selector valve 13a to the oil reservoir 9 through the first pressure-proportional solenoid valve 12a, which remains in the original state, after flowing through the pilot line f.

In the course of these operation, the pressure-proportional solenoid valve 12a or 12b adjusts its opening area in accordance with the output value of an electrical signal from the controller 11 so that the hydraulic pilot pressure to be outputted to the corresponding signal-receiving port of the pilot-operated directional control valve 5 can be adjusted. As described above, the lever-operated, electrical control device 10, controller 11 and pressure-proportional solenoid valves 12a,12b constitute a lever-operated signal generation means that generates a pilot signal for switching the operated position and opening area of the pilot-operated directional control valve 5 by tilt-operation of the steering lever 10a.

Also illustrated are a first selector valve 13a switchable to permit selectively outputting a pilot signal from the lever-operated signal generation means or a pilot signal from the steering-wheel-operated signal generation means 6 to the left signal-receiving port of the pilot-operated directional control valve; a second selector valve 13b switchable at the same time as the first selector valve 13b to permit selectively outputting a pilot signal from the lever-operated signal generation means or a pilot signal from the steering-wheel-operated signal generation means 6 to the right signal-receiving port of the pilot-operated directional control valve; a lever switch 14 as a lever-operated manual switch for permitting steering the vehicle by tilt operation of the steering lever 10a when operated manually; a selector-valve-switching valve 15 operable such that it is set in a right position at normal time to drain pilot oil from a pilot line h to the oil reservoir 9, and by a control signal from the lever switch 14, is switched to a left position to guide pilot oil from the main pilot line e to lower signal-receiving ports of both the selector valves 13a,13b through a pilot line j and the pilot line h; the pilot line h for guiding pilot oil from the secondary side of the switching valve 15 to the lower signal-receiving ports of both the selector valves 13a,13b; and the pilot line j as a flow passage for branching pilot oil out from the main pilot line e and supplying it to the selective-valve-switching valve 15.

The selector valves 13a,13b are each constructed with a combination of signal-receiving ports at mutually-opposing positions (upper and lower positions in the embodiment of FIG. 1), and at normal time, are set in the upper positions under bias of upper springs s to permit outputting a pilot signal from the steering-wheel-operated signal generation means 6 to the pilot-operated directional control valve 5 through the pilot lines c,d. By guiding pilot oil to their lower signal-receiving ports, they are switched to the lower positions to permit outputting a pilot signal from the lever-operated signal generation means, in other words, a hydraulic pilot pressure from the pressure-proportional solenoid valves 12a, 12b to the pilot-operated directional control valve 5. By guiding the pilot pressure to their upper signal-receiving ports, on the other hand, they are switched to the upper positions to permit outputting a pilot signal from the steering-wheel-operated signal generation means 6 to the pilot-operated directional control valve 5 even when pilot oil has been guided to their lower signal-receiving ports.

The lever switch 14 is a normally-open on/off switch, and at normal time, namely, when opened, is set in the mode that uses the steering wheel 7a. When closed, however, the lever switch 14 is switched into the mode that uses the steering lever 10a. An on/off signal that indicates the on/off state of the lever switch 14 is inputted to the controller 11. When the operator turns on the lever switch 14 to set it in the mode that uses the steering wheel 7a, the lever switch 14 outputs an electrical signal to the left signal-receiving port of the selector-valve-switching valve 15 through the controller 11 so that the switching valve 15 is switched to the left position.

This selector-valve-switching valve 15 then guides pilot oil from the pilot line e to the lower signal-receiving ports of both the selectors 13a,13b through the pilot line j and pilot line h to switch the selector valves 13a,13b to the lower positions. As a result, the tilt operation of the steering lever 10 permits outputting a hydraulic pilot pressure from one of the pressure-proportional solenoid valves 12a,12b to the corresponding one of the signal-receiving ports of the pilot-operated directional control valve 5 through the corresponding one of the pilot lines f,g and drainage of a hydraulic pilot pressure from the other signal receiving port from the other one of the pressure-proportional solenoid valves 12a,12b through the other one of the pilot lines f,g.

As described above, the lever-operated manual switching means is constructed by arranging the lever switch 14 as a lever-operated manual switch and the selector-valve-switching valve 15. It is further constructed such that the selector valves 13a,13b are switched by manual operation of the lever switch 14 to permit outputting a pilot signal from the lever-operated signal generation means to the pilot-operated directional control valve 5, thereby permitting steering of the vehicle by tilt operation of the steering lever 10a. This construction-vehicle steering system has made it possible to selectively perform steering of the vehicle by either rotational operation of the steering wheel 7a or tilt operation of the steering lever 10a owing to the addition of such a steering hydraulic circuit as described above, which is associated with the lever-operated signal generation means, to the above-mentioned steering circuit associated with the steering-wheel-operated signal generation means 6.

It is to be noted that, when the rotary directional control valve 7 is in the neutral position, the pilot lines c,d between the pilot-operated directional control valve 5 and the steering-wheel-operated signal generation means 6 form a closed circuit and cut off the flow of pilot oil guided to the left and right, signal-receiving ports of the pilot-operated directional control valve 5 at the time of non-operation of the steering wheel 7A. During non-operation of the steering-wheel-operated signal generation means 6, no hydraulic pilot pressure can, therefore, be drained from one of the left and right, signal-receiving ports of the pilot-operated directional control valve 5 when a hydraulic pilot pressure is guided to the other signal-receiving port. If nothing is done, it will be impossible to switch the pilot-operated directional control valve 5 without any problem by the steering lever 10a.

The pressure-proportional solenoid valves 12a,12b, selector valves 13a,13b and selector-valve-switching valve 15 are specifically arranged to overcome such a problem. This has made it possible to use the steering lever 10a in addition to the steering wheel 7a by adding the simple construction. Described specifically, the pressure-proportional solenoid valves 12a,12b and selector valves 13a,13b are arranged to switch the selector-valve-switching valve 15 by turning on the lever switch 14 such that the pressure-proportional solenoid valves 12a, 12b are communicated to the left and right, signal-receiving ports of the pilot-operated directional control valve 5. It is, therefore, possible to guide pilot oil from the corresponding one of the pressure-proportional solenoid valves 12a, 12b to the corresponding one of the left and right, signal-receiving ports of the pilot-operated directional control valve 5 and also to drain pilot oil from the other signal-receiving port to the side of the oil reservoir 9 by the other pressure-proportional solenoid valve. The pilot-operated directional control valve 5 can, therefore, be switched without any problem by the tilt operation of the steering lever 10a.

To heighten the reliability of steering control and to improve the safety of steering control, this construction-vehicle steering system is specifically provided with the automated switching means for preferential control by the steering wheel. Based on FIG. 1, a description will now be made about this automated switching means for preferential control by the steering wheel.

This automated switching means for preferential control by the steering wheel is a means for automatically switching the selector valves 13a,13b to the upper positions such that, when the operator has rotationally operated the steering wheel 7a, a pilot signal can be instantaneously outputted from the steering-wheel-operated signal generation means 6 to the pilot-operated directional control valve 5 even when the selector valves 13a,13b have been switched to the lower positions to permit outputting a pilot signal from the lever-operated signal generation means to the pilot-operated directional control valve 5 as a result of turning on of the lever switch 14.

The automated switching means for preferential control by the steering wheel as shown in FIG. 1 is constructed such that a pilot signal, which is for switching the pilot-operated directional control valve 5, is guided from the steering-wheel-operated signal generation means 6 to the upper signal-receiving ports of both the first selector valve 13a and second selector valve 13b to switch both the selector valves 13a,13b to the upper positions and the pilot signal from the steering-wheel-operated signal generation means 6 can be outputted to the pilot-operated directional control valve 5 through the pilot lines c,d. Specifically, the automated switching means for preferential control by the steering wheel is constructed by arranging a shuttle valve 16 that selects higher one of a hydraulic pilot pressure in the pilot line i for guiding its hydraulic pilot pressure to the upper signal-receiving ports of the first selector valve 13a and second selector valve 13b and a hydraulic pilot pressure in the left and right, pilot lines c,d for guiding the hydraulic pilot pressure from the steering-wheel-operated signal generation means 6 for switching the pilot-operated directional control valve 5 and guides the higher hydraulic pilot pressure to the pilot line i (the higher hydraulic pilot pressure is nothing but a hydraulic pilot pressure generated by operation of the steering wheel 7a).

A description will hereinafter be made about advantageous effects of the above-described construction-vehicle steering system.

As the construction-vehicle steering system is provided with the steering-wheel-operated signal generation means 6 which is in turn provided with the rotationally-operable steering wheel 7a, the construction vehicle is conveniently allowed under regulations to travel going or coming on general roadways. The operation of the steering wheel 7a is rotational operation, and therefore, the steering wheel 7a is extremely large in the amount of maximum operation. The steering-wheel-operated signal generation means 6, therefore, makes it possible to easily perform fine control which needs to be frequently performed during traveling on a general roadway, and also makes it possible to perform driving operation with the same maneuvering feeling as general cars. Accordingly, this construction-vehicle steering system is suited for traveling on general roadways while retaining the excellent performance of the conventional construction-vehicle steering systems as they are.

In addition to the equipment of such excellent performance of the conventional technologies as they are, this construction-vehicle steering system is also provided with the lever-operated signal generation means, which is provided with the tilt-operable steering lever 10a and which by the tilt operation of the lever 10a, generates a pilot signal for switching the pilot-operated directional control valve 5. The construction-vehicle steering system is, therefore, designed to permit selective performance of operation by the steering lever 10a as manual ON/OFF operation of the leer switch 10. Different from the conventional technologies, the construction-vehicle steering system is also suited for work at construction sites. Described specifically, the operation of the steering lever 10a is tilt operation that causes the lever 10a to tilt by bending or extending the wrist while holding the lever 10a with one hand. The amount of maximum operation can be extremely small compared with that of operation of the steering wheel 7a. Even if it becomes necessary during work at a construction site to frequently perform large operation that makes the self-propelled vehicle 1 go in a large curve, the operation-related load applied to an operator is far smaller compared with that applied upon operation of the steering wheel 7a.

The above-described lever 10a is suited for operation by holding it with one hand. When traveling is performed at a construction site while performing work there as in the case of performing digging work by a wheel loader, a control means for one or more hydraulic actuators relating to the work can, therefore, be easily operated with one hand while operating the steering lever 10a with the other hand. At this time, the operation of the body-articulating hydraulic cylinders 2 is performed under control by the lever as in the operation commonly performed in the operation of the one or more hydraulic actuators for the work. Therefore, the operation of both the hydraulic actuators can be performed by operation means of the same kind unlike the conventional technologies, and hence, can be performed with ease compared with the conventional technologies. The operation by the steering lever 10a is operation by the lever-operated, electrical control device 10, which can be operated with reduced force. The operation by the operator at the time of work can, therefore, be facilitated further.

As described above, the construction-vehicle steering system is suited not only for traveling on general roadways but also for work at construction sites. In addition to such an excellent control function, the construction-vehicle steering system is designed to instantaneously permit steering by the steering wheel 7a in the event of an emergency even when the lever switch 14 has been switched to the mode that uses the steering lever 10a. The construction-vehicle steering system can, therefore, perform high-reliability steering control. Described specifically, the construction-vehicle steering system is provided specifically with the automated switching means for preferential control by the steering wheel, which has the pilot line i and shuttle valve 16. Even when the selector valves 13a,13b have been switched by the lever switch 14 to permit using the steering lever 10a, the selector valves 13a, 13b are hence automatically switched to permit outputting a pilot signal from the steering-wheel-operated signal generation means 6 to the pilot-operated directional control valve 5 when the steering wheel 7a of excellent operability and high reliability is rotationally operated in an instant in the event of an emergency.

With this construction-vehicle steering system, steering control can hence be performed by the steering wheel 7a in the event of an emergency or the like even when work is being performed with the lever switch 14 switched to the mode that uses the steering lever 10a, because upon rotational operation of the steering wheel 7a by the operator as needed, control by the steering wheel 7a can be instantaneously performed without needing switching operation by the lever switch 14. As described above, this construction-vehicle steering system is suited not only for traveling on general roadways but also for work at construction sites and can perform high-reliability steering control.

As a consequence, this construction-vehicle steering system can reduce an operational load on its operator to decrease the operation-related fatigue of the operator compared with the conventional technology upon performing steering control of the construction vehicle, and can also improve the safety with respect to steering control of the construction vehicle. Further, it is also designed to perform, through the same pilot-operated directional control valve 5, the control of the body-articulating steering hydraulic cylinders by a pilot signal from any one of the steering-wheel-operated signal generation means 10 and the lever-operated signal generation means. This has made it possible to decrease the number of pilot-operated directional control valves 5 to be arranged for controlling the body-articulating hydraulic cylinders 2 and hence to simplify the hydraulic circuit.

Based on FIG. 2, a description will finally be made about a construction-vehicle steering system according to a second embodiment of the present invention.

The construction-vehicle steering system according to the second embodiment is not substantially different from the above-described construction-vehicle steering system according to the first embodiment except for the specific construction of the automated switching means for preferential control by the steering lever. Concerning the second embodiment, a description will thus be made centering about an automated switching means shown in FIG. 2 for preferential control by the steering wheel. It is to be noted that elements of structure in FIG. 2 as designated by like reference numerals as in the above-described FIG. 1 indicate like elements in FIG. 1 and therefore, will not be described in detail.

This automated switching means for preferential control by the steering wheel comprises the shuttle valve 16 for selecting and outputting higher one of a hydraulic pilot pressure in the pilot line i for guiding the hydraulic pilot pressure to the upper signal-receiving ports of the first selector valve 13a and second selector valve 13b and a hydraulic pilot pressure in the left and right pilot lines c,d for guiding the hydraulic pilot pressure from the steering-wheel-operated signal generation means 6; and a cancel valve 17 arranged in the pilot line j that supplies pilot oil from the pilot pump 4 to the selector-valve-switching valve 15. This cancel valve 17 is arranged such that the hydraulic pilot pressure, which has been selected at the shuttle valve 16, is outputted to a left signal-receiving port of the cancel valve 17.

At normal time, the cancel valve 17 is set in the right position to communicate the pilot line j to the side of the selector-valve-switching valve 15 and also to drain pilot oil from the pilot line i to the oil reservoir 9. When a hydraulic pilot pressure is outputted from the shuttle valve 16 to the left signal-receiving port of the cancel valve 17 and the cancel valve 17 is switched to the left position, the pilot line j is brought into communication with the pilot line I, and at the time of switching of the selector-valve-switching valve 15 to the left position, pilot oil which has been guided to the lower signal signal-receiving ports of the selector valves 13a,13b is drained to the oil reservoir 9 through the pilot line h and the selector-valve-switching valve 15.

Now assume that the lever switch 14 has been turned on to switch it to the mode that uses the steering lever 10a. At this time, the selector-valve-switching valve 15 has been switched to the left position, and therefore, the selector valves 13a,13b have been switched to the lower positions to permit outputting a pilot signal from the lever-operated signal generation means to the pilot-operated directional control valve 5. When the steering wheel 7a is rotationally operated in the event of an emergency or the like in such a state, a hydraulic pilot pressure upon operation of the steering wheel 7a as detected at the shuttle valve 16, in other words, a pilot signal from the steering-wheel-operated signal generation means 6, said pilot signal being for switching the pilot-operated directional control valve 5, is outputted from the shuttle valve 16 to the left signal-receiving port of the cancel valve 17, because the automated switching means for preferential control by the steering wheel is equipped with the above-described construction.

The cancel valve 17 is then switched to the left position to guide pilot oil from the pilot pump 4 to the upper signal-receiving ports of the selector valves 13a,13b through the main pilot line e, pilot line j and pilot line i. As a result, the selector valves 13a,13b are switched to the upper positions to permit outputting the pilot signal from the steering-wheel-operated signal generation means 6, that is, the hydraulic pilot pressure of the pilot lines c,d to the pilot-operated directional control valve 5. At this time, the cancel valve 17 drains the pilot oil, which has been guided to the lower signal-receiving ports of the selector valves 13a,13b, to the oil reservoir 9 through the pilot line h and the selector-valve-switching valve 15 switched to the left position, thereby assisting the switching of the selector valves 13a,13b to the upper positions.

As mentioned above, the construction-vehicle steering system according to the second embodiment is not substantially different from the construction-vehicle steering system according to the first embodiment except for the specific construction of the automated switching means for preferential control by the steering lever, and the automated switching means for preferential control by the steering lever performs an equivalent function as the corresponding means in the first embodiment. Obviously, this construction-vehicle steering system therefore obviously exhibits similar advantageous effects as the construction-vehicle steering system of the first embodiment. Accordingly, this construction-vehicle steering system can also achieve the technical object of the present invention, that is, "to be suited not only for traveling on general roadways but also for work at construction sites and to be capable of performing high-reliability steering control", and further, can also exhibit the various advantageous effects mentioned above with respect to the construction-vehicle steering system of the first embodiment.

When constructing an automated switching means for preferential control by a steering wheel, the automated switching means for preferential control by the steering wheel in the construction-vehicle steering system of the first embodiment can be construct by using especially hydraulic pilot-operated switching valves as the selector valves 13a,13b and by simply guiding a hydraulic pilot pressure of the pilot lines c,d, which has been supplied from the steering-wheel-operated signal generation means 6 upon operation of the steering wheel 7a and has been detected at the shuttle valve 16, to the signal-receiving ports of the selector valves 13a, 13b. Therefore, the construction-vehicle steering system of the first embodiment makes it possible to simplify the construction required for the addition of an automated switching means for preferential control by a steering wheel.

When switching selector valves by an automated switching means for preferential control by a steering wheel, the construction-vehicle steering system of the second embodiment is designed to guide pilot oil from the pilot pump 4, the hydraulic pilot pressure of which is stable different from a hydraulic pilot pressure in the pilot lines c,d, to the signal-receiving ports of the selector valves 13a,13b through the cancel valve 17 without allowing its pressure to vary. Therefore, the construction-vehicle steering system of the second embodiment facilitates to design such that the selector valves 13a,13b can be surely switched upon operation of the steering wheel 7a. As a consequence, the construction-vehicle steering system of the second embodiment can heighten the reliability for the switching operation of the selector valves 13a, 13b by the automated switching means for preferential operation by the steering wheel.

LEGEND

Figure 1:
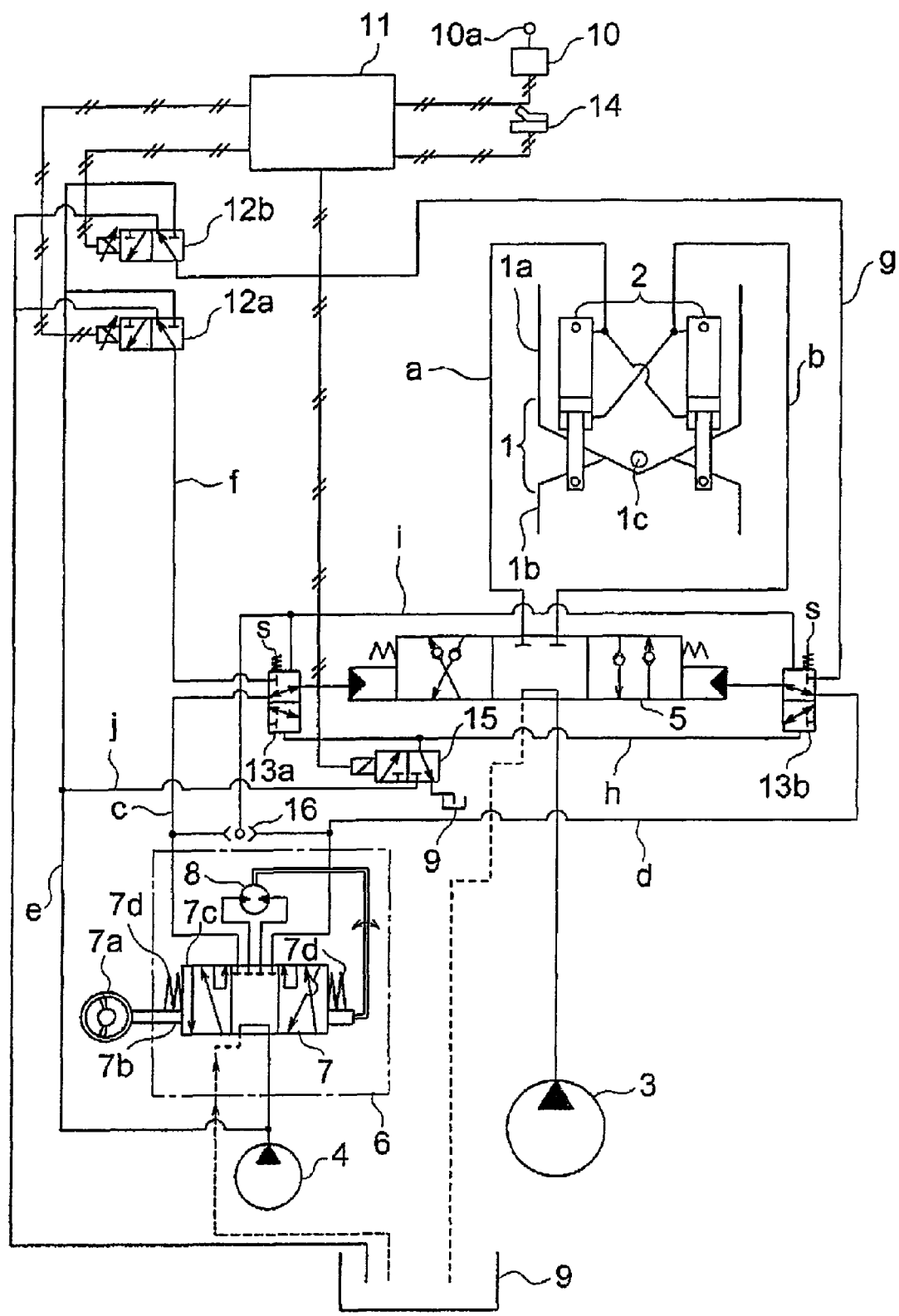
FIG. 1 A hydraulic circuit diagram of a construction-vehicle steering system according to a first embodiment as constructed by practicing the present invention.
Figure 2:
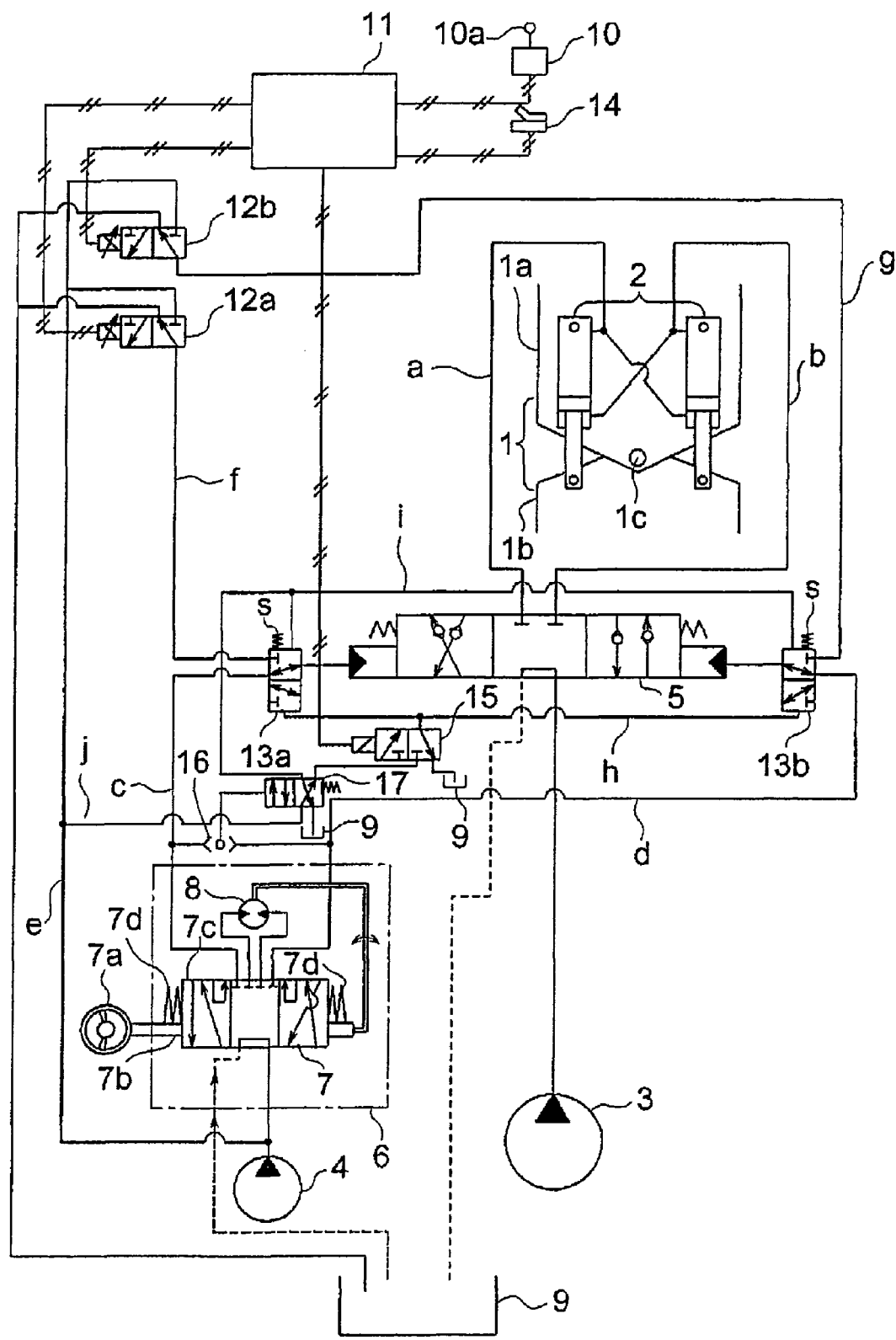
FIG. 2 A hydraulic circuit diagram of a construction-vehicle steering system according to a second embodiment as constructed by practicing the present invention.

1 Self-propelled body
1a Front frame
1b Rear frame
1c Pin
2 Body-articulating hydraulic cylinders
3 Hydraulic pump
4 Pilot pump
5 Pilot-operated directional control valve
6 Steering-wheel-operated signal generation means
7 Rotary directional control valve
7a Steering wheel
7b Rotary spool
7c Valve main body
7d Springs
8 Gear pump
9 Oil reservoir
10 Lever-operated, electrical control device
10a Steering lever
11 Controller
12a,12b Pressure-proportional solenoid valves
13a,13b Selector valves
14 Lever switch
15 Selector-valve-switching valve
16 Shuttle valve
17 Cancel valve
a,b Pressure-oil feed and drain lines
c,d Pilot lines
e Main pilot line
f-j Pilot lines
s Springs

The invention claimed is:

1. A steering system for a construction vehicle, said steering system being provided with steering hydraulic cylinders as actuators for performing steering of said vehicle, a pilot-operated directional control valve for controlling a direction and amount of pressure oil to be fed to said steering hydraulic cylinders, and a steering-wheel-operated signal generation means provided with a rotationally-operable steering wheel such that by rotational operation of said steering wheel, a pilot signal is generated to switch an operated position and opening area of said pilot-operated directional control valve, wherein said steering system comprises a lever-operated signal generation means provided with a tilt-operable steering lever to generate by tilt operation of said lever a pilot signal for switching the operated position and opening area of said pilot-operated directional control valve, selector valves switchable such that the pilot signal from the steering-wheel-operated signal generation means or the pilot signal from the lever-operated signal generation means can be selectively outputted to said pilot-operated directional control valve, a lever-operated manual switching means for switching said selector valves such that by manual operation, the pilot signal from said lever-operated signal generation means can be outputted to said pilot-operated directional control valve to permit steering said vehicle by tilt operation of said steering lever, and an automated switching means for preferential control by said steering wheel to automatically switch said selector valves such that upon rotational operation of said steering wheel, the pilot signal from said steering-wheel-operated signal generation means can be outputted to the pilot-operated directional control valve even when said selector valves have been switched by the manual operation of said manual switching means to permit outputting the pilot signal from said lever-operated signal generation means to said pilot-operated directional control valve.

2. The steering system according to claim 1, wherein said selector valves are each constructed with a combination of mutually-opposing signal receiving ports such that by guiding pilot oil to one of said signal-receiving ports of each selector valve, the pilot signal from said lever-operated signal generation means can be outputted to said pilot-operated directional control valve and by guiding pilot oil to the other signal-receiving port of each selector valve, said selector valves can be switched to permit outputting the pilot signal from said steering-wheel-operated signal generation means to said pilot-operated directional control valve even when pilot oil has been guided to said one signal-receiving port of each selector valve; and said automated switching means for preferential control by said steering wheel is constructed such that, by guiding the pilot signal from said steering-wheel-operated signal generation means to the other signal-receiving port of each selector valve to switch said pilot-operated directional control valve, said selector valves are switched such that the pilot signal from said steering-wheel-operated signal generation means can be outputted to said pilot-operated directional control valve.

3. The steering system according to claim 1, wherein said selector valves are each constructed with a combination of mutually-opposing signal receiving ports such that by guiding pilot oil to one of said signal-receiving ports of each selector valve, the pilot signal from said lever-operated signal generation means can be outputted to said pilot-operated directional control valve and by guiding pilot oil to the other signal-receiving port of each selector valve, said selector valves can be switched to permit outputting the pilot signal from said steering-wheel-operated signal generation means to said pilot-operated directional control valve even when pilot oil has been guided to said one signal-receiving port of each selector valve; said lever-operated manual switching means comprises a lever-operated manual switch for permitting steering said vehicle by tilt operation of said steering lever and a selector-valve-switching valve switchable by a control signal from the lever-operated manual switching means to permit guiding pilot oil to the one signal-receiving port of each selector valve such that the pilot signal from said lever-operated signal generation means can be outputted to said pilot-operated directional control valve; and said automated switching means for preferential control by the steering wheel comprises a cancel valve arranged in a flow passage, which feeds pilot oil from a pilot pump to said selector-valve-switching valve, such that, when a pilot signal from said steering-wheel-operated signal generation means to switch said pilot-operated directional control valve is outputted to a signal-receiving port of said cancel valve and said cancel valve is switched, said selector valves are switched to guide pilot oil from said pilot pump to the other signal-receiving port of each selector valve and to permit outputting the pilot signal from said steering-wheel-operated signal generation means to said pilot-operated directional control valve.

* * * * *